United States Patent

[11] 3,615,948

[72] Inventor Wolfgang P. Krostewitz
  Rock Road West, Green Brook, N.J. 08813
[21] Appl. No. 693,959
[22] Filed Dec. 27, 1967
[45] Patented Oct. 26, 1971

[54] CONCENTRATION FUEL CELL
  1 Claim, 29 Drawing Figs.
[52] U.S. Cl. ................................................. 156/3,
  136/124, 156/18, 117/8, 75/138
[51] Int. Cl. ............................................. B44c 1/22,
  B32b 33/00, H01m 27/04
[50] Field of Search .......................................... 156/3, 2,
  18; 75/138; 117/5.5; 136/120, 124

[56] References Cited
  UNITED STATES PATENTS
  2,658,845  11/1953  Barker ........................ 156/3 X
  3,364,018  1/1968  Kirkpatrick ................. 156/2 X 3,388,805  6/1968  Lovett ........................ 156/3 X Primary Examiner—J. Steinberg
Attorneys—Sheldon H. Parker, Tennes I. Erstad and Robert G. Crooks ABSTRACT: The present invention provides a fuel cell comprising a fuel chamber and oxidizer chamber, an electrolyte chamber having electrolyte therein, the electrolyte chamber being hermetically sealed from the first two chambers by a first closed electrode separating the electrolyte chamber from the oxidizer chamber, and by a second closed electrode separating the fuel chamber from the electrolyte chamber. Each of the electrodes are composed of a material selectively permeable to only one of the cell reactants and substantially impermeable to the others, their impurities, and reaction products. Said electrodes are formed by vapor deposition on a porous metal base of an easily removable metal coating which is selectively etched away.

After partial alloying

INVENTOR
Wolfgang Krostewitz
BY
Sheldon H. Parker
ATTORNEY

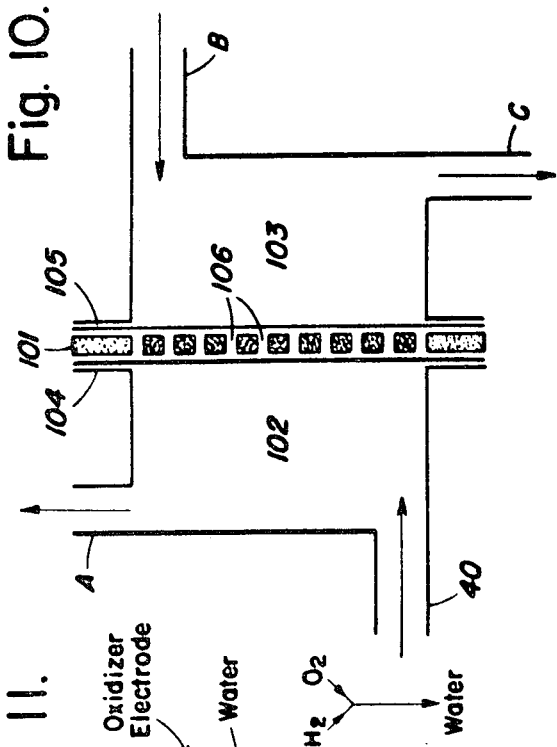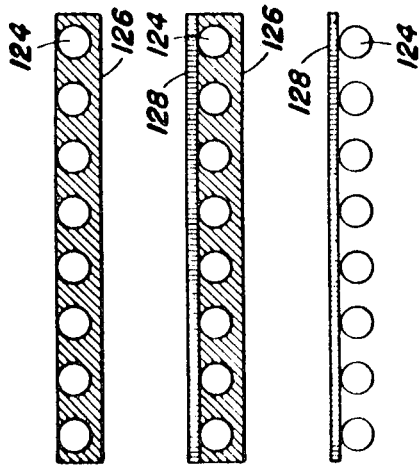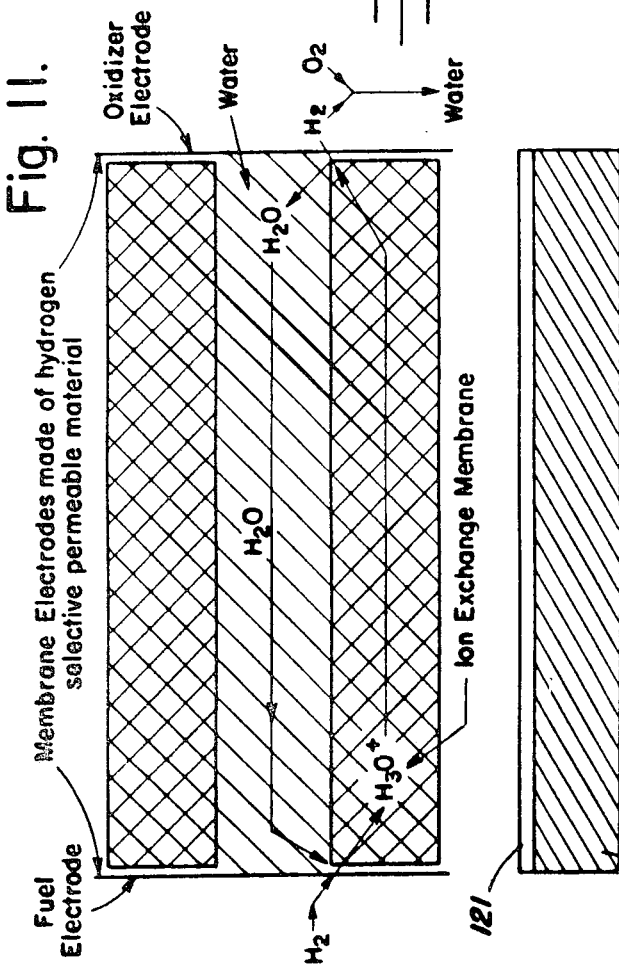

After partial alloying

Membrane with masking screen

Membrane Electrode with ceramic dots for insulation

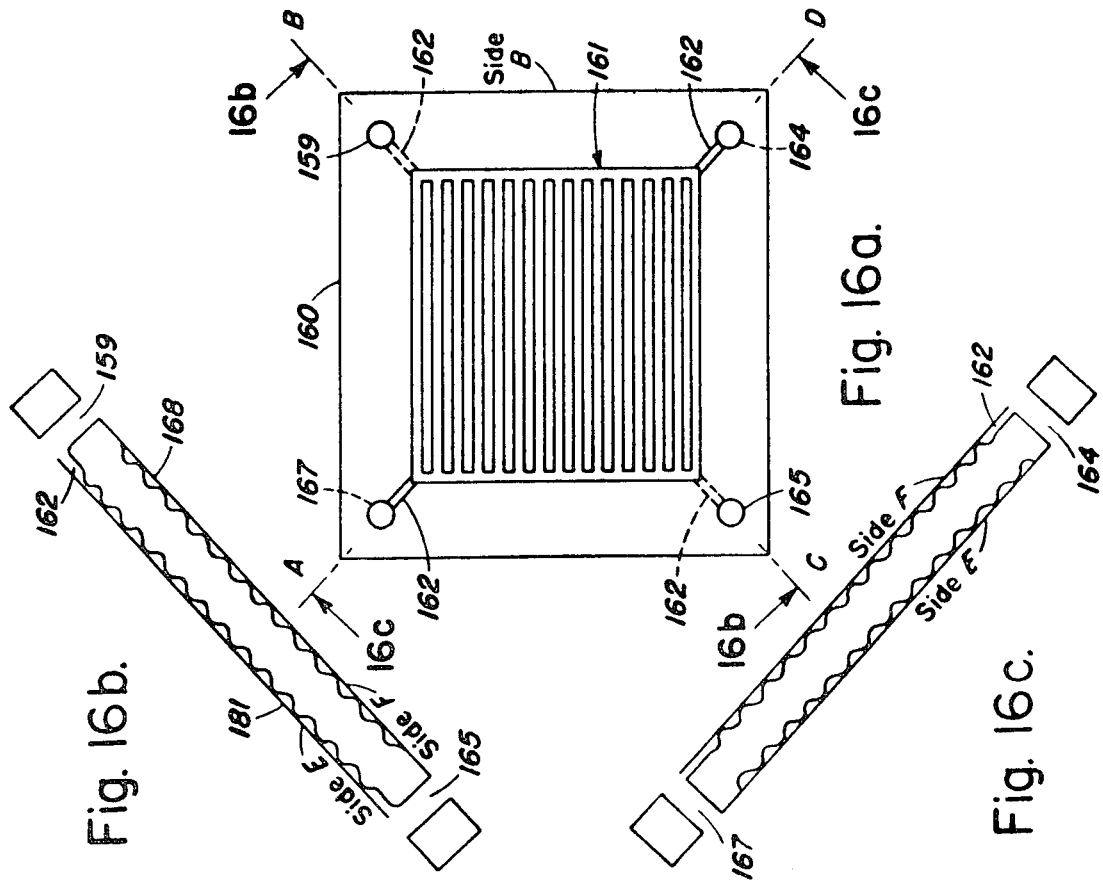
Fig. 16a.
Fig. 16b.
Fig. 16c.
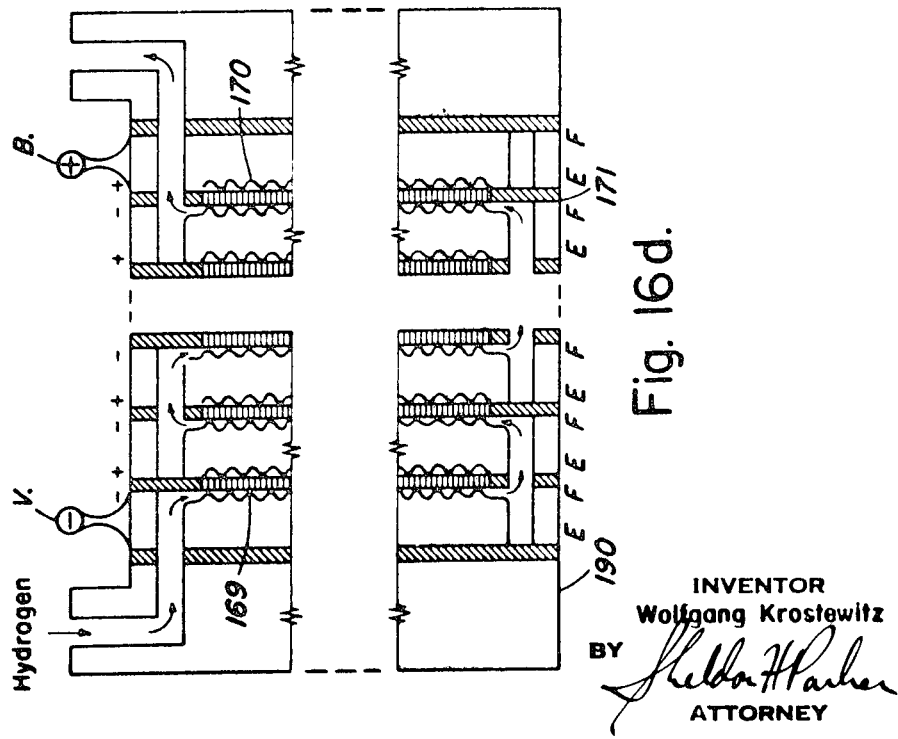
Fig. 16d.
INVENTOR
Wolfgang Krostewitz
BY
ATTORNEY

CONCENTRATION FUEL CELL

The invention herein disclosed relates to a novel device for the direct conversion of chemical energy to electrical energy, which device develops a voltage as a result of the difference in the concentration of one reactant in the electrodes thereof.

Although fuel cells of one sort or another have been known for over 100 years, they have failed to find extensive use. This is the case despite the fact that their theoretical efficiency is not as limited as the efficiency of heat engines.

Up to this time, most of the fuel cells which have been studied consist of two electrodes immersed in a common electrolyte, which may be acid, neutral, or basic, solid or liquid. The reactants, the fuel and the oxidant, are externally supplied to the respective electrodes. These electrodes become charged because the reactants dissolve into the electrolyte in ionic form by taking or releasing electrons from or at the electrodes. In sequence, these ions react with each other in the electrolyte to form the reaction products.

After the electrodes have reached a certain electrical potential respective to each other, the reaction (dissolution, ionization, and the combination of ions to reaction products) stops but will continue if the electrical charge between the electrodes can balance. This may happen over an external load where the balancing current can be used to do work.

For a fuel cell of this type, the reactants must dissolve into the electrolyte in ionic form. This can only happen where reactants, electrolyte, and electrodes are in physical contact. That is to say, in points where the meniscus between the electrodes and the electrolyte is forming, or, more precisely, where a three-phase boundary exists.

To optimize current production from fuel cells, it has heretofore been thought necessary to provide the greatest possible area which can offer a three-phase boundary. To this end, a variety of porous electrodes have been suggested and tried. Although some of these porous electrodes perform reasonably well, they all have some shortcomings which are caused by their porous structure. Thus, when liquid electrolytes are used, the porous electrode structure must contain an electrolyte repellent material or must be constructed in such a way that the electrolyte will not flood the porous electrodes if an appropriate pressure difference is maintained between the reactant and the electrolyte container. This can be achieved by making these electrodes out of several layers of porous material having different pore sizes.

Electrodes having both features performing still better nevertheless, such electrodes will not perform well under vibration conditions, in high gravitational fields, or with inadequate pressure changes between electrolyte and the reactant chamber. Such electrodes are also limited in size due to the increasing hydrostatic pressure of the electrolyte which can be compensated only to a certain extent. Another shortcoming of the porous electrodes is that there are very limiting restrictions on the electrolyte.

Thus the electrolyte cannot have an appreciable vapor pressure since it would evaporate into the reactant chamber where it will be carried away by the continuous flow of the reactants. Since the vapor pressure of all matter rises with temperature increase, the vapor pressure also limits the highest temperature at which porous electrodes can be used.

Another important requirement on the electrolyte used with porous electrodes is that it shall not be chemically attacked, or diluted, or contaminated by the reactants, their contaminations, or the reaction products since this might and usually will change its properties to such an extent that it cannot be tolerated. Yet most of the porous body of the electrode and its surface is not useful for the electricity-forming reaction but used only as a support for the active area inside the electrode. Since the reactants have to diffuse to this active area, contaminations or inert matter will accumulate in the pores and considerably inhibit the diffusion of the reactant to the active area. Finally, the electrolyte has to be inert and nonpoisoning toward the electrode material and toward all the catalyst deposited on these electrodes. In addition, the catalysts used for the transition of the reactants between the electrodes and the electrolyte have to be stable against the respective reactants and contaminations thereof and the corresponding reaction product produced at this electrode.

The various problems above-noted which arise in fuel cell technology can all be traced back to the requirement that a large three-phase boundary be provided at the electrodes thereof where absorption, activation, and desorption or dissolution can occur which will provide the electrochemical force. There are no known fuel cells which are not subject to this limitation.

Accordingly, one object of this invention is to provide a novel electrode in which the electricity-producing reaction takes place at electrodes which do not allow physical contact of the electrolyte with the oxidant in its natural state (liquid, gas, or solid).

Another object of this invention is to provide a fuel cell or battery in which the oxidizer electrode prohibits the direct contact of the oxidant with the electrolyte.

Another object of this invention is to provide a fuel cell in which cathode design and anode design prevents the direct physical contact of the electrolyte with the reactants.

A related object of this invention is to provide a novel fuel cell in which selectively permeable electron conductive membranes are used instead of the oxidizer electrode, or for both cathode and anode electrode.

Still another object of this invention is to provide a fuel cell in which all the reaction products are formed outside the electrolyte chamber.

A further object of this invention is to provide a fuel cell in which electrolytes can also be used with vapor pressures ranging up to the stability of the cell.

Another object of this invention is to provide a cell in which none of the reactants or their contaminants have to be inert with respect to the electrolyte.

Still another object of this invention is to provide fuel cell electrodes in which the catalysts are most efficiently positioned, so that their chemical and catalytical stability requirement toward the matter used in the cell is minimal.

These and other related objects, features, and advantages of the present invention will be more fully realized as the description thereof proceeds, particularly when taken together with the accompanying drawings wherein:

FIG. 10 is a schematic view of a fuel cell of this invention using a perforated ion-exchange membrane as electrolyte.

FIG. 11 shows a schematic view of the mechanism of the reactions taking place in the perforated ion-exchange membrane.

FIG. 12 is a cross-sectional view of a thin membrane electrode in accord with the invention.

FIG. 13 is a series of progressive views showing the preparation of thin membrane electrodes with a support.

FIG. 16 is a series of progressive views showing the scheme for preparing and assembling of double membrane electrodes in a battery package.

Viewed broadly, the fuel cell of the present invention comprises three chambers contained in a suitable vessel. The chambers include a fuel chamber, a chamber for the oxidizing agent, and an electrolyte chamber which is hermetically sealed from the other two chambers by solid, closed electrodes. As used herein, the term "closed electrodes" is used in contradistinction to the term "porous electrodes" to signify very thin (0.001 to 0.003 inches thick) electron-conductive membranes having no visible holes and which are intrinsically permeable to a defined material but substantially impermeable to all the other materials used or produced in the cell. The selective permeability of the electrodes is caused by their internal structure or chemical composition and not by their physical structure. These electrodes physically separate the electrolyte from all reactants but one, and from the reaction products resulting from cell operation. As a result of this, it is possible to form all reaction products outside the electrolyte chamber. Therefore, neither the reaction products nor the reactants, but one, and their contaminations can react or contaminate the electrolyte, thereby maintaining constant the concentration of the electrolyte and insuring steady current production. It should be noted at this point that the inventive concept of the closed electrodes herein disclosed is not limited in its application to fuel cells containing only such electrodes, but also includes the employment of closed electrodes in association with porous electrodes as far as the reaction products are formed outside the electrolyte chamber, which would interfere with the performance of the cell.

Figure 1:
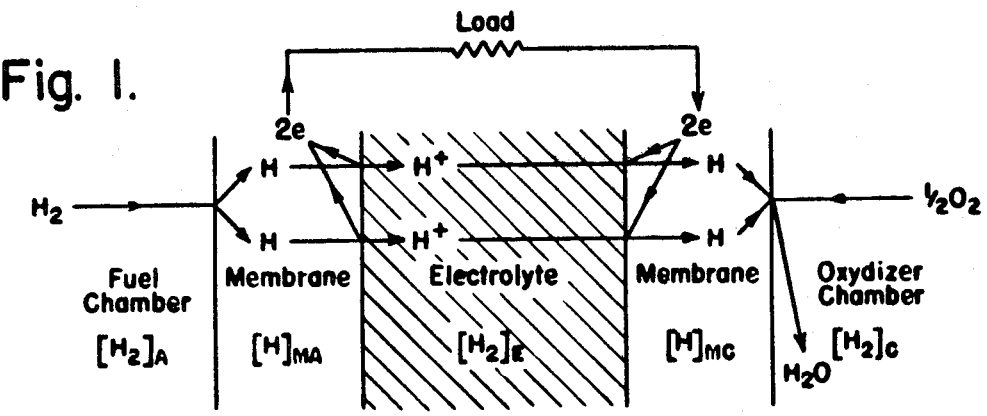
FIG. 1 is a schematic view showing the mechanism of the reactions taking place in a fuel cell having closed electrodes.

Referring now to the drawing, FIG. 1 is given to aid in understanding the mechanism taking place in the cell of the invention.

For the purpose of illustration, the cell shown employs hydrogen obtained from any convenient source and uses oxygen or air to oxidize this fuel. The cell contains two electrodes which are selectively permeable to hydrogen, with hydrogen being soluble therein.

The solubility of the hydrogen in the electrolyte is negligible without being ionized. The solubility of the hydrogen in the selectively permeable membranes is very much greater. Therefore, the diffusion rate of the hydrogen through the selectively permeable membranes is very much greater than the diffusion of the nonionized hydrogen across the electrolyte.

The hydrogen concentrations in the fuel chamber, anode, electrolyte, cathode, and oxidizer chamber are: $(H_2)_A$, $(H)_{MA}$, $(H_2)_E$, $(H)_{MC}$, $(H_2)_C$, respectively. Assuming that the mobilities of the hydrogen are similar in any of these medium leads to the following conclusion: The hydrogen concentrations $(H_2)_A$ and $(H)_{MA}$ between the fuel chamber and the membrane anode-electrode will attain an equilibrium very quickly. The same holds true for the hydrogen concentration $(H)_{MC}$ and $(H_2)_C$ in the cathode membrane and the oxidizer chamber. An equilibrium between the hydrogen concentrations in the anode $(H)_{MA}$ and in the cathode $(H)_{MC}$ will be established only very slowly due to the low hydrogen concentration $(H_2)_E$ in the electrolyte. But there is another way to attain equilibrium between both of these electrodes. If the electrolyte contains a reasonable concentration of hydrogen ions, or other species containing hydrogen ions, and their mobility is not hindered, the hydrogen can also travel through the electrolyte in ionic form. This exchange between the electrodes can only take place if the electrodes are connected by an electron conductor. The hydrogen has to be charged in order to change into the ionic form, which is the only form in which the hydrogen can be transferred through the electrolyte from the anode to the cathode with a reasonable velocity. The hydrogen ions will be discharged at the cathode again and contribute there to an increase in the hydrogen concentration in the cathode until the hydrogen concentration in both electrodes are the same. The current flowing through the electron conductor connected to the electrodes maybe used for work. It is obvious that the current will diminish as soon as both electrodes have the same hydrogen concentrations. The presence of an oxidizer like air or oxygen in the oxidizer chamber causes a decrease of the hydrogen concentration in the cathode because the hydrogen released from the cathode immediately reacts with the oxidizer, especially in the presence of a catalyst. This results in a low hydrogen concentration in the cathode membrane as long as an oxidizing reagent is present in the oxidizer chamber, which in turn will establish an EMF between the electrodes corresponding to the hydrogen concentration difference between said electrodes. From the terminals of said electrodes a current can be drawn which will be most efficiently utilized with any electrical device which matches the impedance of such fuel cell. A similar mechanism applies to oxygen-selective permeable membranes.

Figure 2:
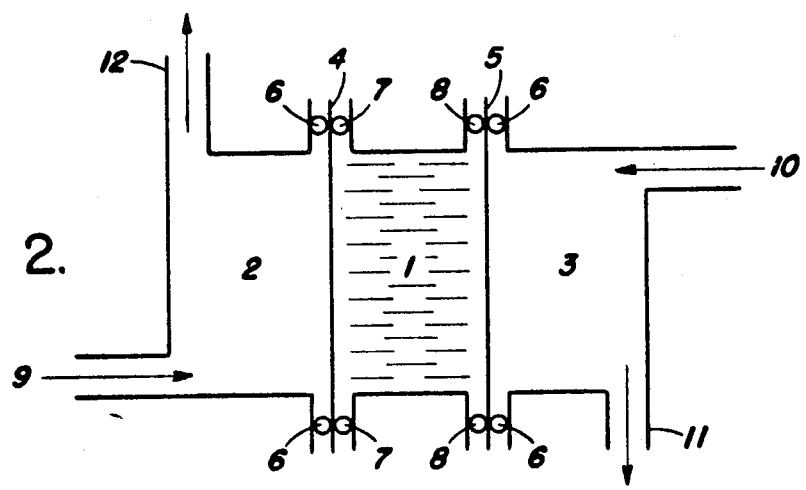
FIG. 2 is a schematic view of one embodiment of the invention.

FIG. 2 shows a tangible embodiment of the present invention comprising an electrolyte chamber 1, composed of a nonelectronically conductive material, a fuel chamber 2, and an oxidizer chamber 3.

Closed electrodes 4 and 5 separate the oxidizer chamber 3 and fuel chamber 2 from the electrolyte chamber 1. Suitable gaskets or gastight seals 6, 7 and 8 are used between the electrodes 4 and 5 and the chambers 1, 2 and 3. If, however, the electrolyte chamber is made of an electron conductive material, either seal 7 or 8 has to be made of a nonelectron-conductive material such as Teflon, glass, or other material having a high ohmic resistance. Vents 11 and 12 are provided to discharge any nonusable contaminations fed into the chambers through fuel inlet 9 or through oxidizer inlet 10. The vents 11 and 12 may also be used to discharge the reaction products formed in chamber 2 or 3.

The two selectively permeable electrode membranes 4 and 5 may both be hydrogen selective or both oxygen selective. They may consist of platinum, palladium, silver, iron, cobalt, nickel, or other transition metals and their alloys of said metals in which said metals are present in a major portion. A porous electrode may be used in the place of one of the permeable electrodes.

Figure 3:
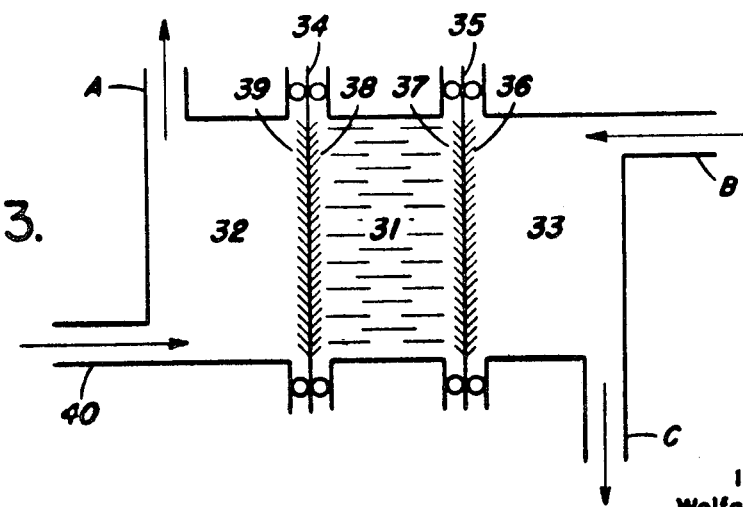
FIGS. 3, 4, 5, 6, 7, 8 and 9 are schematic views of other embodiments of the present invention.

FIG. 3 shows another embodiment of the invention in which two electrodes 34 and 35, selectively permeable to hydrogen are employed. The fuel chamber 32, having a fuel inlet 40 in the lower part thereof and an outlet A in the upper part thereof, an oxidizer chamber 33 having an inlet B for oxidizer gas in its upper part and an outlet C formed therein to leak out as a result of gravity and of the pressure of incoming gas, and an electrolyte chamber 31.

Cells working under such conditions that liquid reaction products are formed, should have their outlet at the lower part. Electrodes 34 and 35 seal off the electrolyte chamber 31 from the oxidizer and fuel chamber 32. Electrode 35 has, on the side facing the oxidizer, a catalyst 36 which promotes the reaction of the hydrogen with the oxidizer, such as for example, but not limited to, platinum, silver, chromium oxide, aluminum oxide, with additional promoters. The electrolyte side of the electrode 35 is covered with a catalyst 37 which promotes the transition of the hydrogen ions from the electrolyte to the membrane electrode, such as for example, but not limited to platinum, palladium, nickel, and Raney catalysts. These catalysts perform much better, if at all, if they are not in contact with the oxidizer. Electrode 34 has a hydrogen ionization catalyst 38 on the electrolyte side which promotes the transfer of the hydrogen from the electrode 34 into the electrolyte in ionic form. Such a catalyst may consist for example, but not limited to platinum, palladium, iron, nickel, and other transition metals. These catalysts are usually very sensitive to impurities in the fuel gas or even the fuel itself and will therefore perform much more efficiently if not in contact with the fuel. The catalyst 39 placed at the fuel side of electrode 34 must be designed specifically for the fuel used. The catalyst promotes the dissolution of hydrogen into the electrode 34, and also, if fuels other than hydrogen are used, the conversion of the fuel to hydrogen such as $CH_4 + 2H_2O \rightarrow CO_2 + 4H_2$ or $2NH_3 \rightarrow N_2 + 3H_2$ or $CO + H_2O \rightarrow CO_2 + H_2$. These catalysts usually will perform much more satisfactorily if they are not in contact with the electrolyte, especially if they are designed for temperatures below 600° C.

Figure 4:
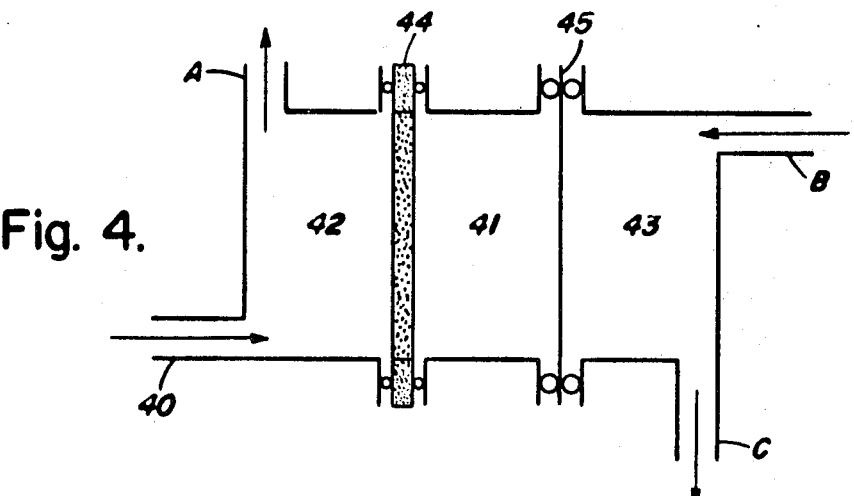

FIG. 4 shows a fuel cell similar to the one described in FIG. 2 and comprising an electrolyte chamber 41, a fuel chamber 42, and an oxidizer chamber 43. The oxidizer chamber is closed by an oxygen selectively permeable membrane 45 composed, for example, of a silver membrane. Between the electrolyte chamber and the fuel chamber is placed a conventional porous electrode 44. The electrolyte housed in chamber 41 may be any which will not interfere with the materials introduced into the fuel chamber 42, or the porous electrode 44, or its performance. A fuel inlet 40 is provided in the lower part of the fuel chamber and elements "A," "B," and "C" are as described before.

The composition of the oxidizer in chamber 43 is not critical. The electrolyte may be alkaline or acid, or may consist of any medium capable of transporting the fuel (or other combustible species formed out of the fuel), or oxygen, or both in ionic form.

The oxidizer may be any material able to supply the necessary oxygen to the oxygen selective permeable membrane. The catalysts used on either side of the membrane can be of a different nature and have to withstand only the materials with which they are in direct physical contact. Suitably, a typical fuel cell of this design uses hydrogen as fuel and has a fuel electrode 44 of porous sintered silver nickel, while its electrolyte is a molten mixture of sodium and potassium hydroxide. The oxygen electrode consists of a thin membrane of silver covered on the electrolyte side with a thin layer of Raney silver and on the oxidizer side with a coating of aluminum silicate impregnated with silver, vandium oxide, and nickel. Many other combinations of electrolyte and oxidizer are possible.

Figure 5:
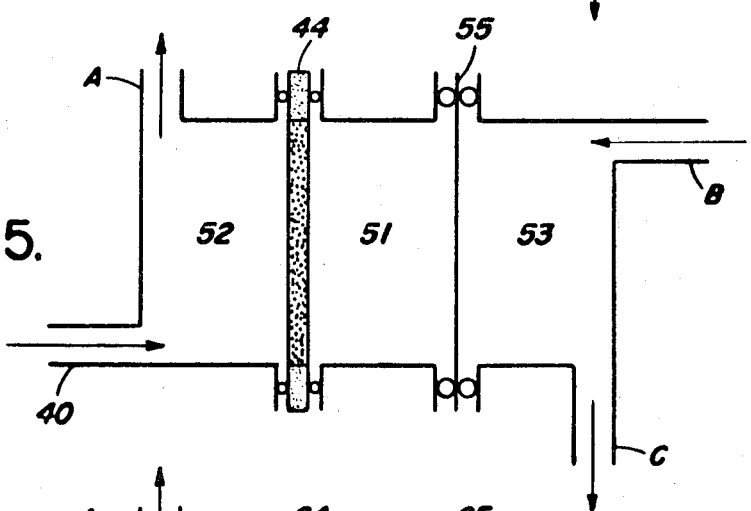

FIG. 5 shows another embodiment of this invention, which comprises fuel chamber 52, electrolyte chamber 51, and oxidizer chamber 53, as well as a porous fuel electrode 44 and a selectively permeable membrane electrode 55 closing the oxidizer chamber, all being of the same composition as described in the previous example. In contradistinction to the fuel cell described in FIG. 4, the selectively permeable membrane which closes the oxidizer chamber is only permeable to hydrogen instead of oxygen. This change imposes a restriction on the usable electrolytes but furnishes another desired feature. Useful electrolytes are only those which are capable of transporting hydrogen ions, e.g., acids. The outstanding feature of this fuel cell is that the reaction water is formed outside the electrolyte, namely in the oxidizer chamber. For this reason, even hydrides of the salt type can be used as electrolytes, such as for example, lithium hydride, which immediately and vigorously reacts with water. A typical example of this fuel cell employs hydrogen as fuel, oxygen as oxidizer, and as the electrolyte, a concentrated phosphoric acid. Suitably, the fuel electrode is made of porous carbon impregnated with platinum. The oxidizer electrode is a thin membrane of palladium or platinum treated on the electrolyte side with platinum black and on the oxidizer side with a silver-silver oxide catalyst.

Figure 6:
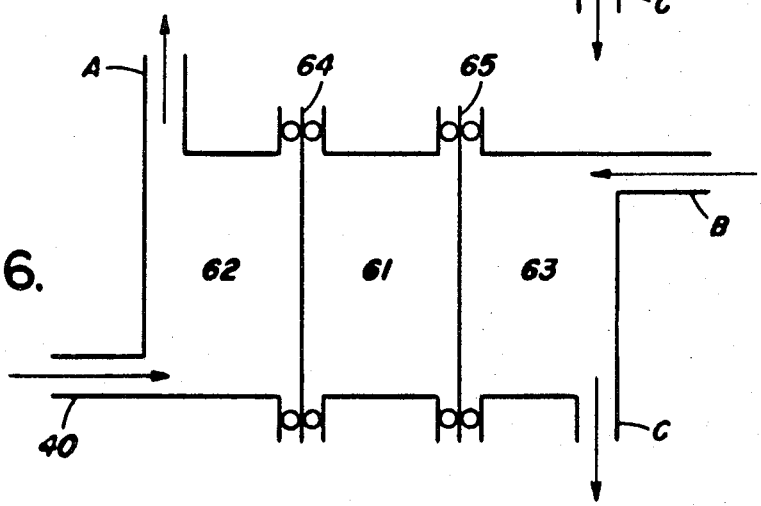

A further embodiment of this invention is shown in FIG. 6. This fuel cell comprises an oxidizer chamber 63, a fuel chamber 62, and an electrolyte chamber 61 provided with the inlets and outlets as described in the previous examples.

In the cell shown in FIG. 6, both reactant chambers 62 and 63 are closed off from the electrolyte chamber by two hydrogen selective permeable membranes 64 and 65. Using a hydrogen selectively permeable membrane 65 for closing the oxidizer chamber requires again an electrolyte capable of transporting hydrogen in ionic form. The major advantages of a fuel cell employing two hydrogen selective membranes are as follows:—All reaction products, including those formed in the fuel chamber by reforming processes, are formed outside the electrolyte chamber and cannot react with, or contaminate the electrolyte. The only material having indirect contact with the electrolyte is hydrogen. Therefore any electrolyte inert towards hydrogen and capable of transporting hydrogen ions and suitably inert towards the electrodes, will be acceptable as the electrolyte. In contradistinction to fuel cells not employing membrane electrodes, said electrolyte may have any vapor pressure (even superatmospheric pressure) up to the stability of the cell.

A typical example of this fuel cell employs two palladium-silver alloy membranes (one for the oxidizer electrode 65 and one for the fuel electrode 64. The electrolyte for this cell is preferably concentrated phosphoric acid under superatomspheric pressure in order to avoid the decomposition of the electrolyte. The fuel ammonia, and the oxidizer oxygen, are also supplied at superatmospheric pressure in order to avoid stress on the membranes. A suitable catalyst for the oxidizer electrode is a silver-silver oxide. The fuel electrode is covered on the fuel side with an iron-oxide-platinum-rhodium catalyst and on the electrolyte side with a Raney platinum-palladium catalyst.

Figure 7:
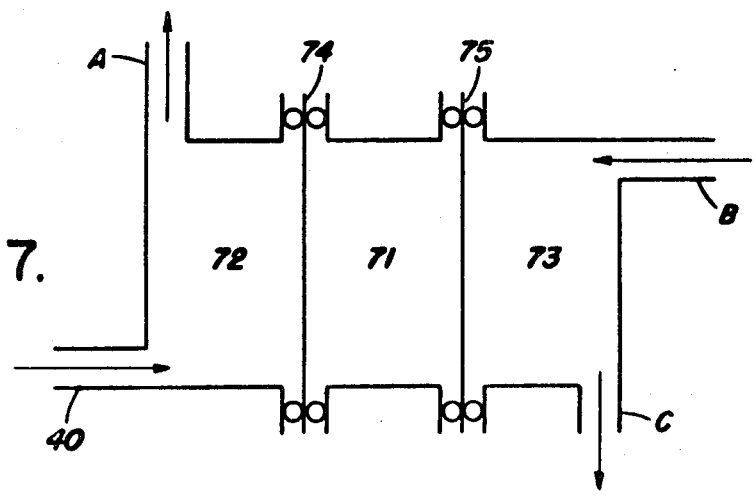

FIG. 7 shows another embodiment of the present invention similar to the one described in FIG. 6 but employing two selective oxygen permeable membranes 74 and 75 and having fuel chamber 72, electrolyte chamber 71, and oxidizer chamber 73. For oxygen permeable membranes, the electrolyte must be capable of transporting oxygen ions from the oxidizer side to the fuel electrode. The main distinction of this fuel cell is that the reaction water and all other possible reaction products are formed in the fuel chamber. The electrolyte must be stable against oxygen and capable of oxygen ion transport. Since the water is formed in the fuel chamber, little or no additional water is needed for the reforming of the fuel. An example of this fuel cell employs an aqueous sodium-potassium hydroxide solution under superatmospheric pressure as the electrolyte, oxygen as the oxidizer, and gaseous methanol as the fuel. The catalyst on the fuel electrode facing the electrolyte is Raney nickel, the one facing the fuel chamber, a silver-platinum-copper-sodium carbonate mixture. The oxidizing electrode has a Raney silver catalyst on the oxidizer side and a Raney nickel catalyst on the electrolyte side.

Figure 8:
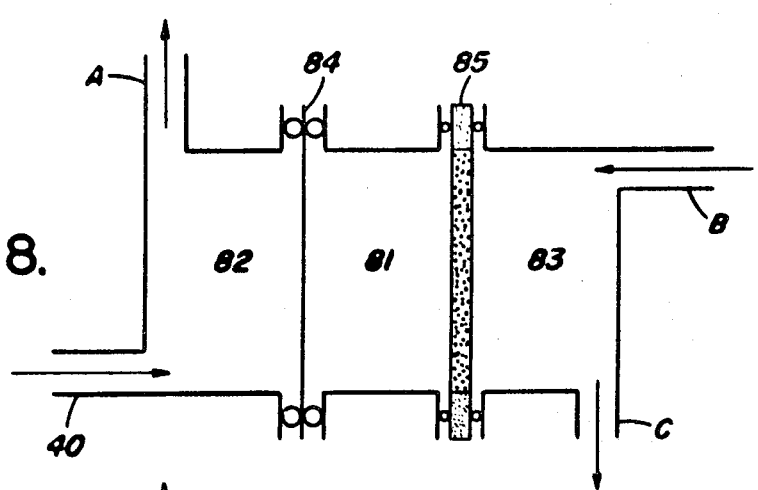

FIG. 8 shows a fuel cell as described with FIG. 5, in which fuel electrode 84 is made of a selective oxygen permeable electron-conductive material. This cell comprises fuel chamber 82, electrolyte chamber 81, and oxidizer chamber 83. Since the selectively permeable oxygen electrode contacts the fuel chamber, the electrolyte must be capable of transporting oxygen in ionic form. The vapor pressure of the electrolyte is restricted by the porous electrode on the oxidizer side. No reaction products are formed in the electrolyte nor in the oxidizer chamber, but all are discharged or formed in the fuel chamber. A preferred example of this fuel cell employs a porous nickel oxide electrode 85 on the oxidizer side and a silver alloy fuel membrane 84 on the fuel side. The electrolyte is a molten mixture of sodium-potassium-lithium carbonate. The oxidizer is air or oxygen and the fuel is carbon monoxide with traces of hydrogen. The catalyst of the membrane side facing the fuel is a platinum-copper catalyst and the one facing the electrolyte is Raney silver. The porous electrode on the oxidizer side is treated with a silver solution.

Figure 9:
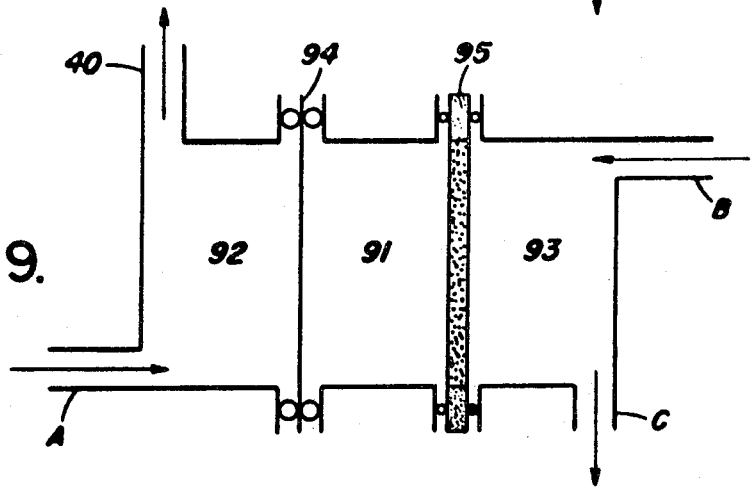
Figure 14A:
FIG. 14 is a series of progressive views showing the enlargement of the surface of thin membrane electrodes.
Figure 14B:
Figure 14C:
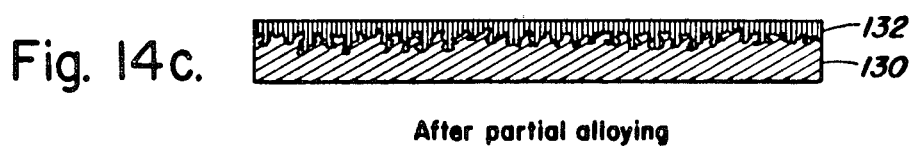
Figure 14D:

FIG. 9 shows another embodiment of this invention. This fuel cell is just the reverse in respect to the electrodes and the selective permeability of the fuel cell described with FIG. 4. The fuel electrode 94 is a membrane which is selectively permeable to hydrogen, composed of, for example, a silver alloy and closes the fuel chamber 92. The oxidizer electrode 95 is of the conventional porous sintered silver type and separates the oxidizer chamber 93 from the electrolyte chamber 91. The electrolyte employed can be an acid or alkaline such as phosphoric acid. As fuel, any material can be used which can be reformed in order to furnish the necessary hydrogen to the fuel electrode, such as methanol. There is no restriction of the composition of the fuel in respect to the electrolyte used. Individual catalysts such as silver and platinum black or palladium black may be used on the membrane side facing the fuel for this conversion process. The reaction water produced in the electrolyte is removed in one of the conventional ways.

An embodiment of a fuel cell with two electrodes and an ion-exchange membrane is shown in FIG. 10. Between the fuel electrode 104 closing the fuel chamber 102, and the oxidizer electrode 105 closing the oxidizer chamber 103 is an ion-exchange membrane 101 separating the two electrodes. The ion-exchange membrane such as a sulfonated polymer, is perforated and is in close contact with the electrodes. The holes or channels 106 which provide a direct passage between the two membrane electrode junctions are filled with a suitable electrolyte such as water. The minimum number of holes or channels necessary for obtaining the advantages of a perforated ion-exchange membrane is one. The average diameter of said channel or channels ranges between $10^{15}$ and 10 cm. In this example of the claimed cell, hydrogen selective permeable electrodes are used and the ion-exchange membrane is composed of a sulfonated polymer.

The advantage of a perforated ion-exchange membrane over a nonperforated ion-exchange membrane, used in conjunction with porous electrodes, is that the water which has been transported by the hydrogen ions through the membrane will not drain from the oxidizer electrode but will flow back to the fuel electrode through the perforation. The transport of the water is caused by the hydrogen ions moving from the fuel electrode to the oxidizer electrode whenever current is drawn from the cell. These hydrogen ions ($H^+$) move in the form of hydronium ions ($H_3O^+$), which are a combination of $H^+$ and $H_2O$, through the ion-exchange membrane. After consumption of the hydrogen ion at the oxidizer electrode, the water is released and will usually drain at the oxidizer electrode. The side of the membrane facing the fuel electrode will therefore become dry if no water is supplied to this side of the membrane which in turn will cause an intolerable polarization in the cell. By using perforated ion-exchange membranes, the water released at the oxidizer electrode does not drain, but flows back thorough the perforation to the fuel electrode where it is needed to prevent this polarization. The porous structure of the electrodes in conventional fuel cells makes it prohibitive to apply such perforated ion-exchange membrane since the water would drain out of the holes and thereby eliminate the necessary barrier preventing the direct reaction of the reactants.

Many other equivalent embodiments of these fuel cell systems are possible without departing from the inventive concept. Such embodiments are within the scope of one skilled in the art. The invention shall therefore not be restricted by the examples nor the illustrations used in this disclosure.

Preferred methods for preparing the electrode membranes of the invention are given below.

One conventional way of preparing suitable nonporous electrode membranes is to roll a sheet of the permeable metal to the desired thickness.

FIG. 12 shows a semipermeable electrode formed by the deposition of a thin film of the desired semipermeable electrode material 121 at the surface of a suitable material 122 which is easily removable by chemical or physical means thereafter. The deposition of the thin film may be achieved by electroplating, vapor phase deposition, amalgamation techniques, decomposition of metal organic compounds, and others. The backing material may be composed of for example, but without limitation, zinc, aluminum, alkali halides, actually any material which can be removed afterwards without destroying the membrane film. Thus, a flat piece of potassium bromide is formed by applying a high pressure on top of a die filled with potassium bromide. At one surface of the piece, a thin film of palladium is placed by vapor phase deposition. After dissolution of the potassium bromide, a thin membrane of palladium remains. A similar film is achieved by electroplating one side of an aluminum sheet with palladium and dissolution of the aluminum with sodium hydroxide thereafter. In order to achieve the desired mechanical strength of these membranes, they may be fixed by suitable means to a supporting screen, porous plate, or perforated sheet, etc.

FIG. 13 shows the preparation of another membrane electrode. A screen or perforated or porous sheet called a permanent backing 124, shown in FIG. 13a, and composed of a suitable metal, such as silver, nickel, copper, etc., is treated with an easily removable temporary backing material 126 so that all holes and pores are filled by this material, as shown in FIG. 13b. Thereafter, one side of this body is ground to expose most of the pattern of the permanent backing, as illustrated in FIG. 13c. This procedure is followed by the deposition of the selectively permeable membrane 128, to give the structure shown in FIG. 13d. As a final step, the temporary backing is removed as described before, thus giving the structure of FIG. 13e. As one example of this process, a silver screen (100 mesh) is dipped in a 60 percent nitric acid solution for 2 seconds and thereafter in a molten zinc bath and removed from there immediately. One side is ground until the silver screen pattern is exposed and the surface shows to be even and flat. After placing a thin film of metal on this surface by vapor phase deposition, the desired thickness of the film is achieved by electroplating additional metal onto the surface. The zinc is thereafter dissolved by treating the same in 5N sodium hydroxide solution.

FIG. 14 shows a procedure for increasing the surface of a membrane electrode. Each side of the membrane 130 shown in FIG. 14a, is coated with an easily removable metal 132 which is able to alloy with the membrane as shown in FIG. 14b. A heat treatment of the coated membrane will cause partial alloying of the metals as shown in FIG. 14c. If the nonalloyed portion of the alloying metal is thereafter removed by one of the methods above described, there results the membrane as shown in FIG. 14d, which has a surface area many times greater than the untreated membrane. As an example of this procedure, palladium membrane is coated with an aluminum layer by vapor phase deposition. The sample is then treated at 500° C. for 10 minutes and the aluminum dissolved thereafter in an aqueous sodium hydroxide solution.

Figure 15A:
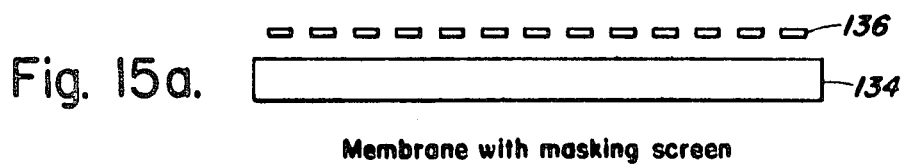
FIG. 15 is a series of progressive views showing the preparation of membrane electrodes with a multiplicity of ceramic dots.
Figure 15B:
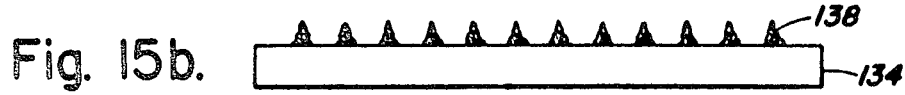

Although the electrolyte is a necessity in any fuel cell, it is still desirable to have the electrolyte layer between the electrodes as thin as possible. Usually the electrodes are spaced further apart in order to avoid having the electrodes touch each other and thereby short the cell. By using the procedure demonstrated in FIG. 15, it is possible to bring the electrodes very close together without any danger of their coming in contact as a result of warping or other causes. As shown in FIG. 15a, the electrode 134, is masked by a screen 136 at a suitable distance from the electrode. By using a high temperature ceramic spray, sprayed through the screen, it is possible to produce very tiny discontinuous ceramic dots 138, at the surface of a membrane of platinum, silver, iron, cobalt, nickel and the like to give a membrane electrode as shown in FIG. 15b. The size of these dots determines the spacing of the electrodes and also prevents undesired electrical shorts in the fuel cell. The screen is a convenient tool, but is not essential for producing said discontinuous ceramic layer since it is also possible to produce a similar discontinuous ceramic layer at the surface by exposing the surface for a short time to a ceramic spray.

FIG. 16 shows a complete fuel cell assembly which utilizes hydrogen as its fuel and uses double membrane electrodes. As shown in the figure, a sheet 160 of metal such as brass, iron, copper, etc. which is not permeable to the reactants is used. Channels 161 are etched or scratched into the surface of this sheet as shown in FIG. 16a. The channels 162 on side F shown in FIG. 16b connect the openings 159 and 165 with the main channel pattern 161 in the middle on the back portion (Side E). The cavities 162 connect the holes 164 and 167 with the main channel pattern on the front (Side F). On the top of both sides of the metal sheet, thin membranes 181 and 168 are placed covering all the channels and openings, but not eliminating them. Thereafter, at each of the four corners, A, B, C, and D, openings 159, 167, 165, and 164 are drilled through the sheet. The cross section view B–C is shown in FIG. 16b and the cross section A–D is shown in FIG. 16c.

These membranes 181 and 168 may just be placed on top of the nonpermeable sheet and made gastight thereafter in the cell container 190 by pressure or may be resistance-welded to the metal sheet or other procedures may be applied as described before (vapor phase deposition, electroplating, etc.).

Figure 17:
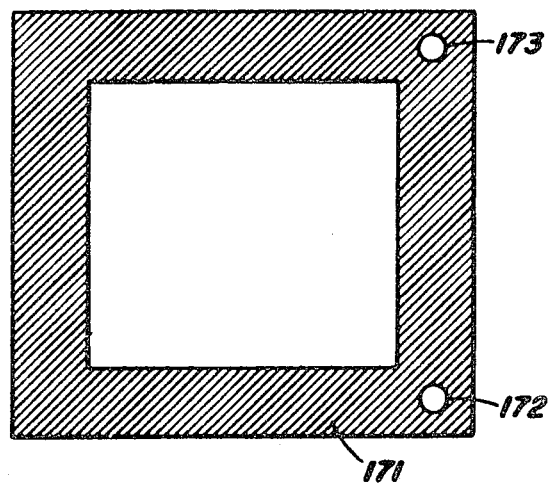
FIG. 17 is a top plan view of gasket used in the battery package for the cells of this invention.

Such double membrane electrodes may be stacked together, as shown in FIG. 16, forming a battery. The end pieces of the battery 169 and 170 may have the cavity pattern only on one side, but also double membrane electrodes may be used while not making use of one side. Each double membrane electrode is separated from the other by a nonelectronconductive gasket (FIG. 17) such as Teflon or others. The gasket 171 is provided with two openings 172 and 173 matching the appropriate holes in the double membrane electrode. The gasket provides, at the same time, a narrow space between the double membrane electrodes which serves as a container for the necessary electrolyte. It is possible to stack these double membrane electrodes and gaskets together in such a way that the fuel streams through opening 164, through the cavities on Side F to hole 167, thence through the cavities on Side F to hole 167 of the next double membrane electrode, and so on. A similar through-pass is available for the oxygen, which passes in contradistinction to they hydrogen, through the cavities on Side E. Terminals V.B. provide the contact with end pieces of the stacked battery. This becomes evident if one looks at the cross section A-D of the package. As seen in the drawing, FIG. 16d, every other electrode is placed upside down. A battery assembly in this way will provide a voltage (n-1) times the voltage of a single fuel cell of this kind, wherein n is the number of metal sheets used in the cell having those channels. The advantages of this cell assembly are the following:

1. Easy cell assembly, if desired, to high voltage packages.
2. Better utilization of fuel and oxidizer.
3. Battery will be rigid and compact.
4. Mass production possible.
5. Easy heat dissipation possible, by extending the nonpermeable metal sheets to fins or passing heat exchange liquids through tubes which are provided inside the nonpermeable metal sheet.
6. The cavities can be filled with suitable catalysts.

Figure 18:
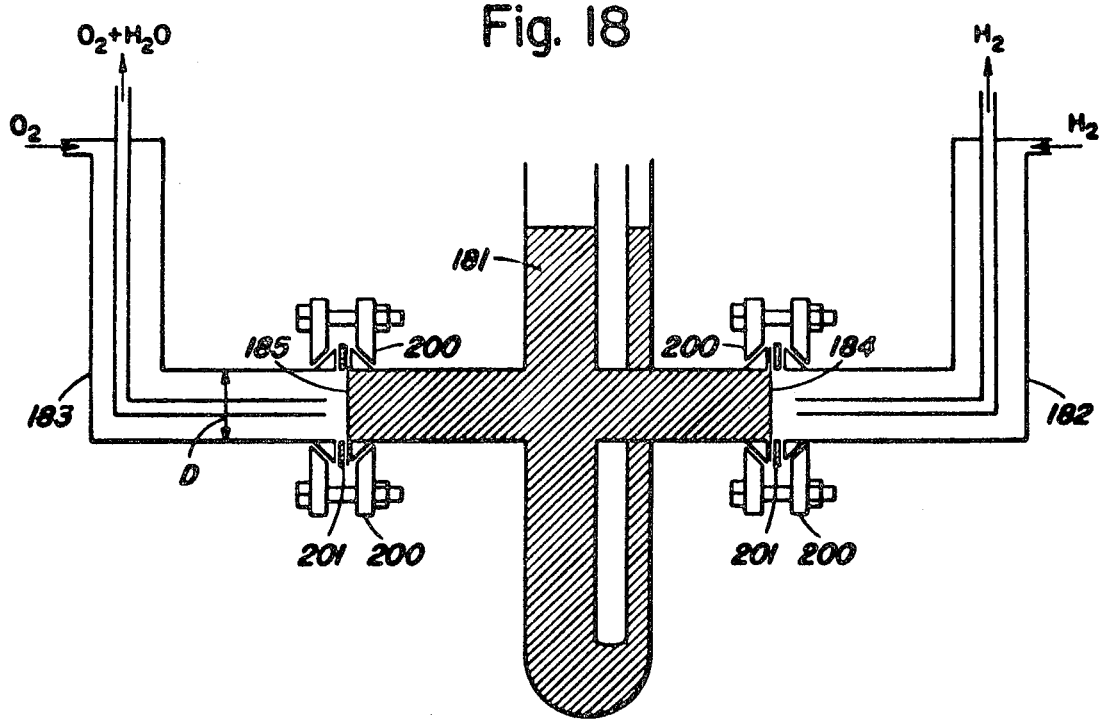
FIG. 18 is a cross-sectional view of another cell of the invention.

In one embodiment of this invention, a cell was constructed of the type shown in FIG. 18 which corresponds to the schematic cell shown in FIG. 6. The active diameter (D) of the electrodes exposed to the electrolyte and the reactants was 13 mm. with a distance between the two electrodes 185 and 184 of 115 mm. Flanges 200 were used to secure the gas chambers 188 and 182 to electrolyte chamber 181 with Teflon gaskets 201 therebetween. The electrodes 184 and 185 were 0.001 inch thick palladium membranes. Electrolyte chamber 181, gas chambers 182 and 183 were filled with a solution containing 2.978 g. $(PtCl_6)H_2n \cdot H_2O$ and 223 mg. $Pb(C_2H_3O_2)_2 \cdot 3H_2O$ in 100 ml. of distilled water. Three additional auxiliary electrodes (not shown) were placed in the cell, one in each chamber 181, 182, and 183. At any given time, a voltage of 6 volts was imposed to one of the auxiliaries and one of the membrane electrodes for 1 minute.

The polarity and choice of the electrodes were in such a sequence that both sides of both membrane electrodes received a platinum black deposit. While imposing this voltage, a current in the range of 35-40 m.A. was drawn. Then the electrodes were flushed five times with distilled water in 1 hour intervals. After the electrodes were washed with acetone and dried, the electrolyte chamber was filled with 28 percent phosphoric acid. The fuel chamber was flushed with nitrogen before the hydrogen was introduced in order to prevent any deactivation. of the catalyst deposit on the surface of the membrane electrode. Hydrogen and oxygen gases from high pressure tanks were fed to the fuel and oxidizing electrodes. Immediately, upon the introduction of the hydrogen, the voltage at the cell terminals rose to 0.36 volts. At 20°, 0.2 volts and 1,300 microamperes were observed 22 seconds after a load was imposed. After 11 minutes, this had changed to 900 microamperes and 0.15 volts and became steady.

Substantially the same results as obtained above with palladium electrodes are obtained with electrodes of platinum, iridium, rhonium, iron, nickel, cobalt, silver, titanium, zirconium, hafnium, thorium and alloys thereof in which said metals are present in a major portion.

Obviously, many modifications and variations of the present invention are possible in the light of the above teachings. It is, therefore, to be understood that within the scope of the appended claims the invention may be practiced otherwise than as specifically described.

We claim:

1. A method for making a fuel cell electrode comprising providing a selectively permeable membrane of palladium; coating said membrane of palladium with aluminum by vapor phase deposition; heating the coated membrane at a temperature in the range of 500° C. for a time duration that is in the neighborhood of 10 minutes to cause partial alloying of the aluminum with said membrane of palladium; and thereafter dissolving the aluminum.

* * * * *